US010095028B2

(12) United States Patent  
Matsushita

(10) Patent No.: US 10,095,028 B2  
(45) Date of Patent: Oct. 9, 2018

(54) DISPLAY LIGHT PROJECTION OPTICAL DEVICE

(71) Applicant: Yazaki Corporation, Minato-ku, Tokyo (JP)

(72) Inventor: Junichi Matsushita, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 96 days.

(21) Appl. No.: 15/215,732

(22) Filed: Jul. 21, 2016

(65) Prior Publication Data

US 2016/0327792 A1 Nov. 10, 2016

Related U.S. Application Data

(63) Continuation of application No. PCT/JP2015/055711, filed on Feb. 26, 2015.

(30) Foreign Application Priority Data

Feb. 26, 2014 (JP) .................. 2014-035492

(51) Int. Cl.  
*G02B 27/14* (2006.01)  
*G02B 27/01* (2006.01)  
(Continued)

(52) U.S. Cl.  
CPC .......... *G02B 27/0101* (2013.01); *B60K 35/00* (2013.01); *G02B 1/11* (2013.01);  
(Continued)

(58) Field of Classification Search  
CPC ........ G02B 27/0101; G02B 1/11; G02B 5/08; G02B 27/0018; G02B 27/01; B60K 35/00  
(Continued)

(56) References Cited

U.S. PATENT DOCUMENTS 3,762,809 A 10/1973 Kato et al.  
5,625,493 A 4/1997 Matsumura et al.  
(Continued)

FOREIGN PATENT DOCUMENTS

JP S51-022377 7/1976  
JP H06-69964 A 3/1994  
(Continued)

OTHER PUBLICATIONS

Sep. 28, 2017—(JP) Notification of Reasons for Refusal—App 2014-035492.

(Continued)

*Primary Examiner* — James Greece  
(74) *Attorney, Agent, or Firm* — Banner & Witcoff, Ltd.

(57) ABSTRACT

There are provided a first optical member that is transparent and is formed in a thin plate shape; a Fresnel-shaped portion that is formed in a concentric form on one surface of the first optical member in the thickness direction; a half mirror layer that is formed on a surface of a Fresnel-shaped portion; a second optical member that is formed of a transparent filler for filling unevenness of a surface of the half mirror layer to form a flat surface; and a third optical member that has a transparent thin plate shape protecting an outside surface of the second optical member. A refractive index of the first optical member, a refractive index of the second optical member, and a refractive index of the third optical member are equal.

12 Claims, 4 Drawing Sheets

(51) Int. Cl.
  *B60K 35/00*   (2006.01)
  *G02B 5/08*    (2006.01)
  *G02B 1/11*    (2015.01)
  *G02B 27/00*   (2006.01)

(52) U.S. Cl.
  CPC ........... *G02B 5/08* (2013.01); *G02B 27/0018* (2013.01); *G02B 27/01* (2013.01); *B60K 2350/206* (2013.01); *B60K 2350/2052* (2013.01); *G02B 2027/012* (2013.01); *G02B 2027/013* (2013.01)

(58) Field of Classification Search
  USPC ......................................................... 359/631
  See application file for complete search history.

(56) References Cited

U.S. PATENT DOCUMENTS

| | | | |
|---|---|---|---|
| 5,708,522 A * | 1/1998 | Levy | B60R 1/088 359/237 |
| 6,185,045 B1 * | 2/2001 | Hanano | G02B 27/0172 359/630 |
| 6,236,511 B1 | 5/2001 | Brown | |
| 6,952,312 B2 | 10/2005 | Weber et al. | |
| 7,123,418 B2 | 10/2006 | Weber et al. | |
| 7,656,585 B1 * | 2/2010 | Powell | G02B 5/09 349/11 |
| 7,715,103 B2 | 5/2010 | Sprague et al. | |
| 8,659,840 B2 | 2/2014 | Masuda et al. | |
| 2004/0135742 A1 | 7/2004 | Weber et al. | |
| 2005/0270655 A1 | 12/2005 | Weber et al. | |
| 2009/0067057 A1 | 3/2009 | Sprague et al. | |
| 2009/0201589 A1 * | 8/2009 | Freeman | G02B 27/0103 359/630 |
| 2011/0228403 A1 | 9/2011 | Masuda et al. | |
| 2013/0257689 A1 | 10/2013 | Hotta et al. | |

FOREIGN PATENT DOCUMENTS

| | | |
|---|---|---|
| JP | H06-175075 A | 6/1994 |
| JP | 2002-287077 A | 10/2002 |
| JP | 2006-512622 A | 4/2006 |
| JP | 2010-539525 A | 12/2010 |
| JP | 2011-191715 A | 9/2011 |
| JP | 2012-123393 A | 6/2012 |
| JP | 2013-205649 A | 10/2013 |

OTHER PUBLICATIONS

May 19, 2015—International Search Report—Intl App PCT/JP2015/055711.
Sep. 9, 2016—(WO) IPRP—App PCT/JP2015/055711.
Apr. 10, 2018—(JP) Decision of Refusal—App 2014-035492.
Jul. 24, 2018—(JP) Report of Reconsideration by Examiner before Appeal—App 2014-035492.

* cited by examiner

DISPLAY LIGHT PROJECTION OPTICAL DEVICE

CROSS REFERENCE TO RELATED APPLICATIONS

This application is a continuation of PCT application No. PCT/JP15/055711, which was filed on Feb. 26, 2015 based on Japanese Patent Application (No. 2014/035492) filed on Feb. 26, 2014, the contents of which are incorporated herein by reference.

BACKGROUND OF THE INVENTION

1. Field of the Invention

The present invention relates to a display light projection optical device that has characteristics in which display light emitted from a display unit is reflected in the vicinity of one surface and is projected to a predetermined eye point, and external light incident on the other surface is transmitted in a thickness direction.

2. Description of the Related Art

In head-up displays (HUDs) for general vehicles, images of light containing various kinds of information to be displayed are projected from the HUDs to windshields (front window glass) or reflection plates called combiners to form optical paths so that the light reflected from the windshields or the like is oriented in directions of viewpoints of drivers. Accordingly, the drivers can view visual display information of the HUDs shown on the windshields as virtual images simultaneously while viewing scenes in front of the vehicles through the windshields. That is, the drivers can view various kinds of information by display of the HUDs without moving their visual lines while remaining in normal driving states.

PTL 1 discloses that a special optical element (corresponding to the foregoing combiner) is attached on a glass surface of a windshield. Light emitted from an HUD is reflected from the surface of the optical element on the windshield and is oriented in the direction of a viewpoint of a driver. Since the optical element is formed of a material that transmits the visible light, the driver can view not only a display image formed as a virtual image in front of the optical element but also an image of a scene in front of the vehicle in a state in which the image is transmitted through the windshield and the optical element.

PTL 1 discloses that a Fresnel lens is provided on the optical element to form an expansion optical system. Accordingly, the HUD can be miniaturized. Since the Fresnel lens is used, the thickness of the optical element can be decreased.

[PTL 1] JP-A-2012-123393

SUMMARY OF THE INVENTION

However, the optical element in PTL 1 has a problem to be described below. An image of a scene or the like in front of a vehicle is transmitted through the optical element in the thickness direction and reaches the positions of the eyes of a driver. However, an uneven shape of the Fresnel lens is present on a surface of the optical element close to the driver. Thus, since an air layer comes into direct contact with the surface with the uneven shape, optical characteristics exhibit due to a change in the refractive index on the boundary surface.

That is, even when an image of a scene or the like in front of a vehicle is transmitted through the optical element and is emitted from the optical element to the side of the driver, the image is affected by optical magnification of the Fresnel lens. Accordingly, when the driver views a front visual field, the driver may view the front visual field in a state in which the visual field is locally expanded or contracted due to the influence of the Fresnel lens or is affected by distortion or irregular reflection only in a spot in which the optical element is disposed among various regions on the windshield. Accordingly, a region in which it is difficult to view the front visual field may be formed on the windshield by the optical element, and thus there is a possibility of an adverse influence on driving.

In the configuration illustrated in FIG. 7 in PTL 1, a transmission reflection optical layer 15 is disposed at a position adjacent to the uneven shape surface of the Fresnel lens. However, even in the configuration of FIG. 7, there is a difference between the refractive index of the material of the Fresnel lens and the refractive index of the material of the transmission reflection optical layer 15. Therefore, even when optical magnification can be offset in all of the integrated components of the Fresnel lens and the transmission reflection optical layer 15, there is a high possibility of halation or the like occurring due to the influence of internal irregular reflection.

The present invention is finalized in view of the above-described circumstances and an object according to the invention is to provide a display light projection optical device that has an optical expansion function and a reflection surface available for projection of an HUD and that is capable of obtaining good transmission visibility.

In order to achieve the above-described object, the display light projection optical device has the following characteristics (1) to (8).

(1) A display light projection optical device has characteristics in which display light emitted from a display unit is reflected in the vicinity of one surface and is projected to a predetermined eye point, and external light incident on the other surface is transmitted in a thickness direction. The display light projection optical device includes: a first optical member that is transparent and is formed in a thin plate shape; a Fresnel-shaped portion that is formed by a plurality of grooves which are concentric with each other on one surface of the first optical member in a thickness direction thereof; a half mirror layer that is formed on a surface of a Fresnel-shaped portion; a second optical member that is formed of a transparent filler for filling unevenness of a surface of the half mirror layer to form a flat surface; and a third optical member that has a transparent thin plate shape and protects an outside surface of the second optical member. A refractive index of the first optical member, a refractive index of the second optical member, and a refractive index of the third optical member are substantially equal.

(2) In the display light projection optical device having the configuration of the foregoing (1), light anti-reflection layers may be formed on a surface of the first optical member exposed to the outside and a surface of the third optical member exposed to the outside.

(3) In the display light projection optical device having the configuration of the foregoing (1) or (2), the half mirror layer may perform as a band stop filter that reflects only a specific wavelength component.

(4) In the display light projection optical device having the configuration of any one of the foregoing (1) to (3), the display light projection optical device may be disposed as an intermediate layer of laminated glass of which a vehicle windshield is formed.

(5) In the display light projection optical device having the configuration of any one of the foregoing (1) to (4), a disposition state of the Fresnel-shaped portion or an incident target position of the display light may be decided so that an optical axis of light incident on the half mirror layer from the display unit is shifted from a center of the concentric form of the Fresnel-shaped portion.

(6) In the display light projection optical device having the configuration of any one of the foregoing (1) to (5), the entire shape of the first optical member and the shape of the Fresnel-shaped portion may have a curved surface shape conforming to a shape of the vehicle windshield and a curvature of a surface of the Fresnel-shaped portion is decided according to a spherical surface expressed with a constant radius or an aspheric surface expressed in a polynomial.

(7) In the display light projection optical device having the configuration of any one of the foregoing (1) to (6), a pitch P at which the plurality of grooves may be formed in the Fresnel-shaped portion is an approximate value of the following formula:

$$P = (\tan \theta \cdot D)/\text{Pixel},$$

where $\theta$ is a display view angle, D is a distance between an assumed eye point and the Fresnel-shaped portion, and Pixel is a number of vertical or horizontal pixels on a display screen of the display unit.

(8) In the display light projection optical device having the configuration of any one of the foregoing (1) to (7), the half mirror layer may be formed on an entire surface, excluding an erect wall region extending in a direction parallel to the thickness direction in boundaries of the plurality of grooves of the Fresnel-shaped portion.

In the display light projection optical device having the configuration of the foregoing (1), the display light emitted from the display unit is reflected from the surface of the half mirror layer and is oriented to the eye point of a driver. The external light incident from the front side of the vehicle is transmitted through the display light projection optical device and is oriented to the eye point. Since the half mirror layer is formed on the surface of the Fresnel-shaped portion, the half mirror layer forms an expansion optical system in the reflected light. Since refractive indexes of the first optical member, the second optical member, and the third optical member are the same in regard to the light transmitted through the display light projection optical device, there is no reflection in the boundaries of the surfaces. Accordingly, in a case in which the driver views a scene in front of the vehicle, the driver can view the light transmitted through the display light projection optical device as a same-sized image, as in a normal scene viewed through the windshield.

In the display light projection optical device having the configuration of the foregoing (2), with the light anti-reflection layers, it is possible to prevent occurrence of a ghost image with the same magnification or halation caused due to internal irregular reflection.

In the display light projection optical device having the configuration of the foregoing (3), transmitted light can be oriented to the eye point of the driver without substantial attenuation in the half mirror layer. Accordingly, it is possible to improve visibility in a case in which the driver views a front scene through the display light projection optical device. In this case, the wavelength band of the display light can be set as a narrow band using a scanner capable of emitting one piece of laser light or a plurality of R, G, and B pieces of laser light as a light source of the display unit. Therefore, it is possible to efficiently reflect the display light from the half mirror layer having the function of the band stop filter.

Since the display light projection optical device having the configuration of the foregoing (4) is embedded inside the vehicle windshield, the front surface of the windshield can be maintained in a flat state. Therefore, it is possible to project the display light without giving a feeling of discomfort to the driver.

In the display light projection optical device having the configuration of the foregoing (5), it is possible to reduce an influence of a double image ghost occurring due to combination of an expanded image and a same-sized image. That is, since the display image viewed by the driver includes a same-sized image reflected from the front surface or the rear surface of the display light projection optical device as well as an expanded image reflected and formed from the half mirror layer, there is a possibility of a double image ghost being viewed. Since the position of the expanded image and the position of the same-sized image are considerably deviated by shifting the optical axis of light incident on the half mirror layer from the center of the concentric circles of the Fresnel-shaped portion, the double image is rarely viewed.

In the display light projection optical device having the configuration of the foregoing (6), the curved surface shape is formed in conformity to the shape of the windshield of the vehicle. Therefore, it is possible to optimize the display quality when the driver views HUD display.

In the display light projection optical device having the configuration of the foregoing (7), it is possible to ensure a necessary minimum resolution according to the display capability of the display unit. Further, it is possible to prevent spectral diffraction (occurrence of iridescent colors) caused due to diffraction in a Fresnel edge portion or a ghost of a double image or the like, and thus it is possible to reduce occurrence of a flare image caused due to irregular reflection.

In the display light projection optical device having the configuration of the foregoing (8), reflection of light in the erect wall region is suppressed. Therefore, occurrence of an unintended light ray passing along an optical path other than transmission of normal light or one-time reflection is minimized, and thus it is possible to suppress occurrence of a flare image.

The display light projection optical device according to the invention has the optical expansion function and the reflection surface available for projection of the HUD, and thus it is possible to obtain better transmission visibility than in the related art.

The invention has been simply described above. Further, a mode for carrying out the invention to be described below (hereinafter referred to as an "embodiment") will be described with reference to the appended drawings to further clarify the details of the invention.

DETAILED DESCRIPTION OF THE EXEMPLARY EMBODIMENTS

A specific embodiment of a display light projection optical device according to the invention will be described below with reference to the drawings.

<Specific Example of Use Environment of Display Light Projection Optical Device>

Figure 1:
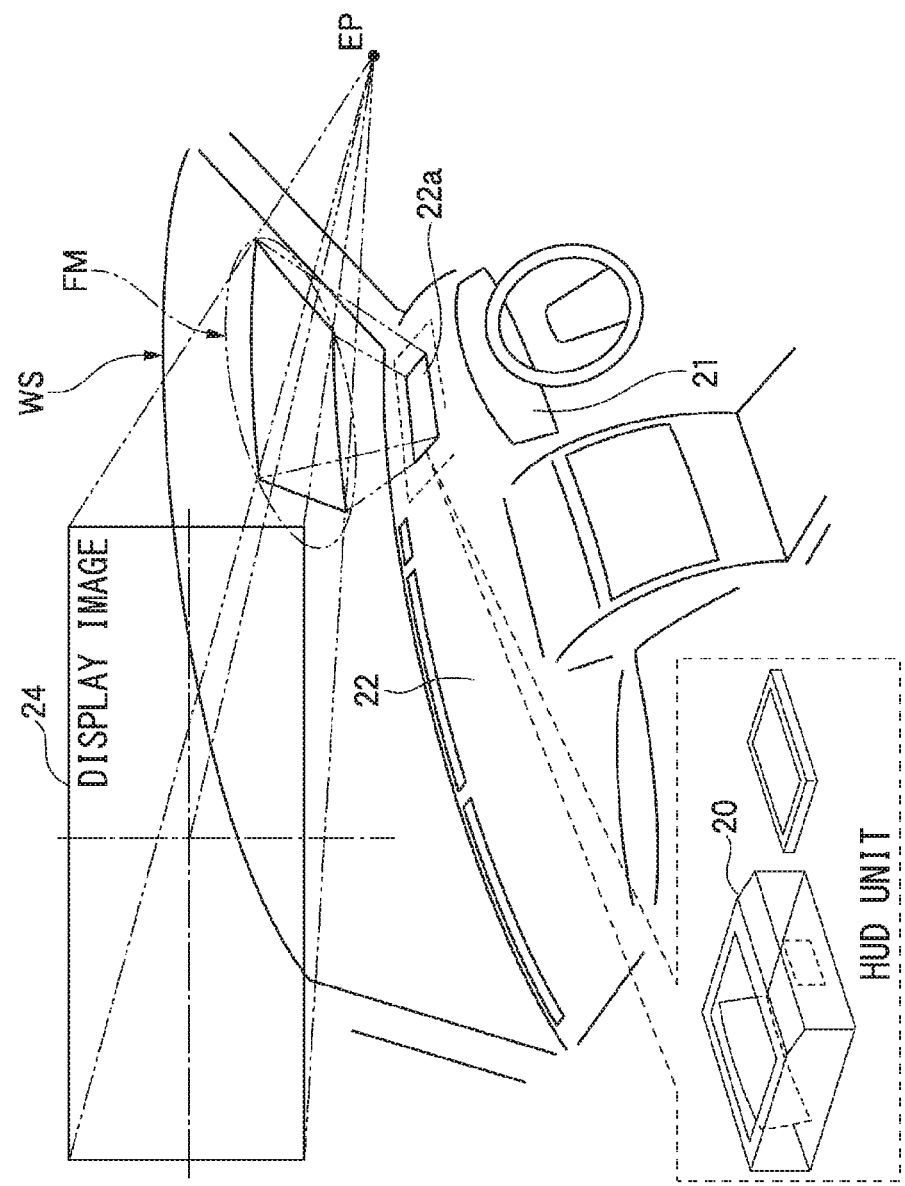
FIG. 1 is a perspective view illustrating the vicinity of a windshield of a vehicle on which a display light projection optical device is mounted when viewed from the interior of the vehicle.
Figure 2:
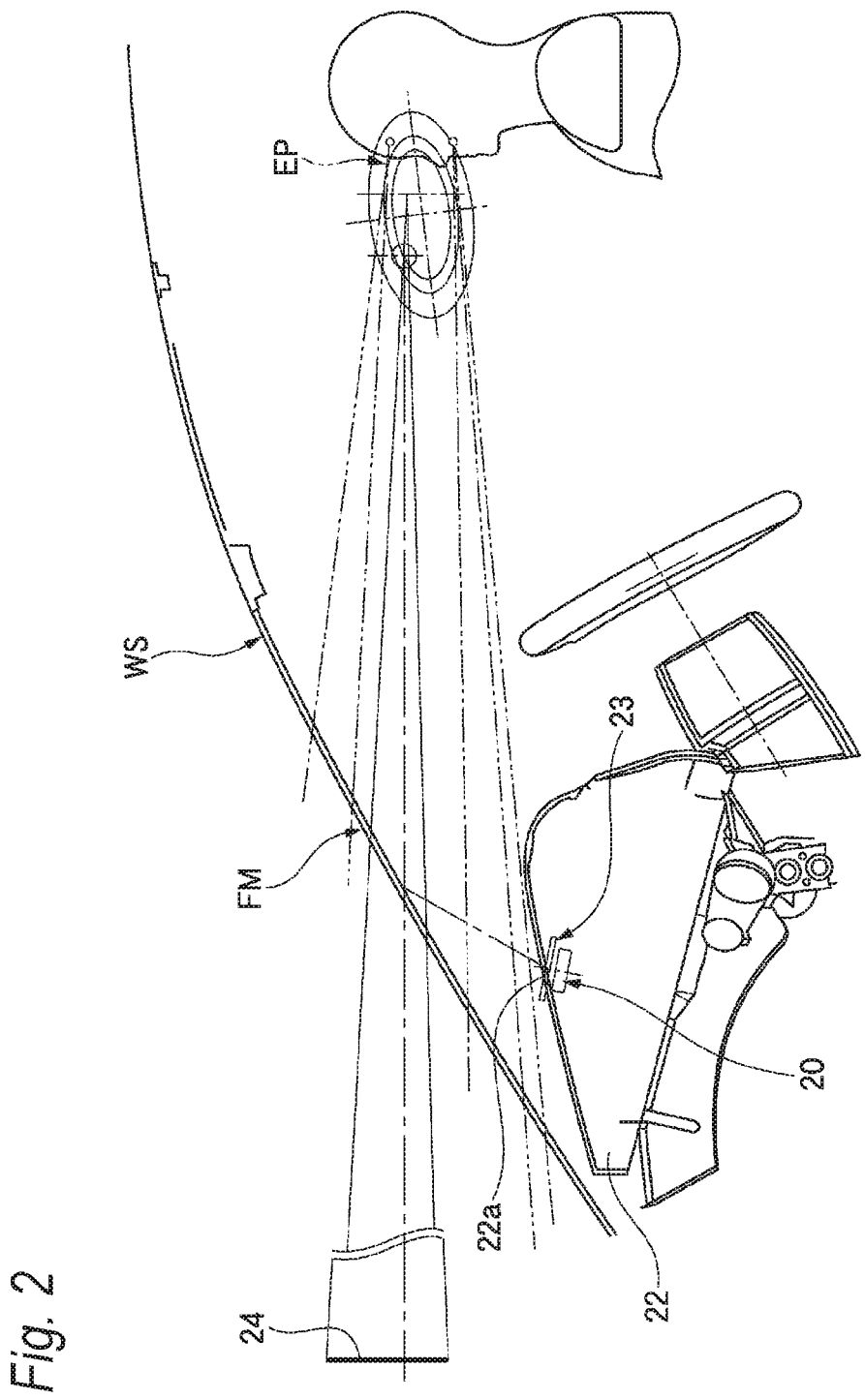
FIG. 2 is a longitudinal sectional view illustrating the same vehicle as that of FIG. 1 when viewed from the lateral side.

FIG. 1 illustrates a state when the vicinity of windshield \NS of a vehicle on which a display light projection optical device according to the embodiment is mounted is viewed in an inclination direction from the interior of the vehicle. FIG. 2 illustrates a disposition state of each unit on the longitudinal sectional surface when the same vehicle as that of FIG. 1 is viewed from the lateral side.

In an example illustrated in FIGS. 1 and 2, the display light projection optical device according to the embodiment is embedded as an intermediate layer in a windshield WS (window glass) of the vehicle formed of laminated glass. A Fresnel mirror region FM is formed in the display light projection optical device. The Fresnel mirror region FM basically has a half mirror and has characteristics in which light incident on the Fresnel mirror region FM from the interior side of the vehicle is reflected and light incident on the Fresnel mirror region FM in the right direction is transmitted from the outside of the vehicle to the right side of FIG. 2. The Fresnel mirror region FM forms an expansion optical system, including a Fresnel lens. The specific configuration of the display light projection optical device will be described in detail below.

In the vehicle illustrated in FIG. 1, a head-up display (HUD) unit 20 is disposed below a dashboard 22 in front of a meter unit 21 is disposed. The HUD unit 20 internally includes, for example, a flat panel display such as a transmissive liquid crystal panel and an illumination light source (backlight). On a screen of the flat panel display, for example, various kinds of information, such as a vehicle speed, useful for driving are displayed as visual information such as text, numerals, signs, as necessary. Display light containing an image of the displayed visual information can be emitted from the HUD unit 20 by illuminating the screen with the backlight.

An opening 22a with a rectangular shape is formed in the spot of the dashboard 22 above the HUD unit 20. Display light emitted from the HUD unit 20 is oriented to the windshield WS located above via the opening 22a. The above-described Fresnel mirror region FM is disposed in a spot of the windshield WS on which the display light from the HUD unit 20 is incident.

Accordingly, the display light emitted from the HUD unit 20 is incident on the surface of the windshield WS, is reflected in the Fresnel mirror region FM, and reaches an eye point EP corresponding to the assumed positions of the eyes of the driver. Since the display light is reflected in the Fresnel mirror region FM, the display image viewed by the driver is formed as a virtual image to be displayed on a virtual image formation surface 24 in front (for example, 10 m on the front side) of the windshield WS. Since the Fresnel mirror region FM transmits the light incident on the interior of the vehicle from the front side of the vehicle as in the windshield WS, the driver can view a scene in front of the vehicle through the Fresnel mirror region FM. That is, the driver CaO simultaneously view the scene in front of the vehicle and the display image displayed by the HUD unit 20 in an overlapping state.

By adopting a Fresnel lens in the Fresnel mirror region FM, the thickness is decreased so that the Fresnel mirror region FM can be embedded in the windshield WS. Since the Fresnel mirror region FM forms an expansion optical system, it is not necessary to internally include an expansion optical system in the HUD unit 20. Compared to a case in which an expansion optical system is internally included in the HUD unit 20, an opening area of the opening 22a can be decreased.

A louver 23 is disposed near the opening 22a. The louver 23 has a function of reflecting unnecessary external light near the opening 22a to suppress orientation of the external light to the eye point EP. Accordingly, visibility of HUD display is improved.

<Configuration of Display Light Projection Optical Device>

Figure 3A:
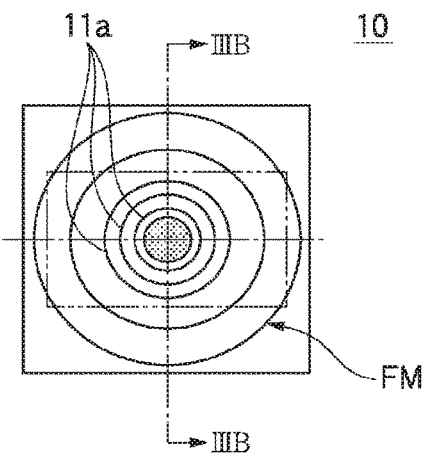
FIG. 3A is a front view illustrating the display light projection optical device according to an embodiment and FIG. 3B is a partially expanded sectional view taken along the line IIIB-IIIB of FIG. 3A.
Figure 3B:
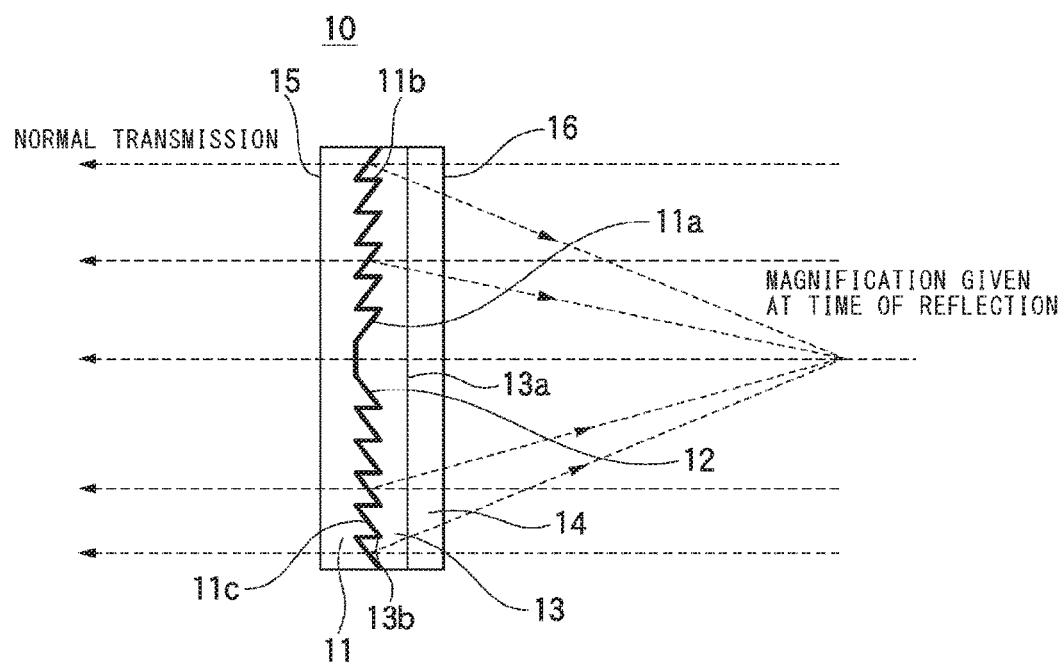

FIG. 3A is a front view illustrating the display light projection optical device according to an embodiment. FIG. 3B is a partially expanded sectional view taken along the line IIIB-IIIB of FIG. 3A.

In the embodiment, the display light projection optical device is configured as a combiner 10 that projects the display light of the HUD unit 20. The combiner 10 has a rectangular shape, as illustrated in FIG. 3A, and is formed with a larger size than the Fresnel mirror region FM illustrated in FIG. 1. The sizes of the combiner 10 and the Fresnel mirror region FM are not limited to this relation. The sizes can be designed in accordance with a specification to be applied to the combiner 10 and the Fresnel mirror region FM.

As illustrated in FIG. 3B, the combiner 10 is formed by a plurality of layers stacked in its thickness direction. Specifically, the combiner 10 includes a Fresnel lens 11, a half mirror layer 12, a sealed layer 13, a transparent plate 14, and AR coat layers 15 and 16.

The Fresnel lens 11 is formed in a thin plate shape with a material such as glass or resin (for example, polymethylmethacrylate resin: PMMA) of which a refractive index (n1) is known. A Fresnel-shaped portion 11a is formed on one surface of the Fresnel lens 11 in the thickness direction and the other surface thereof is formed as a flat surface 11c.

As illustrated in FIG. 3A, the Fresnel-shaped portion 11a has many grooves which are concentric with each other from the center of the Fresnel lens 11, and spaces between the mutually adjacent grooves protrude. Accordingly, the Fresnel-shaped portion 11a has a saw-tooth front surface shape on the cross-sectional surface illustrated in FIG. 3B, A lens is optically formed by this front surface shape. A pitch (Fresnel pitch) P at which grooves and protrusions are formed in the Fresnel-shaped portion 11a will be described below The half mirror layer 12 is formed on the front surface of the Fresnel-shaped portion 11a of the Fresnel lens 11. Specifically, the half mirror layer 12 is formed by depositing a metal or inorganic multi-layer thin film on the front surface. In the embodiment, the half mirror layer 12 is configured to have light reflectivity of 20% in the half mirror layer 12. The thickness of the formed half mirror layer 12 is set to be less than 100 [nm].

In the embodiment, the spot of a Fresnel erect wall 11b of the Fresnel-shaped portion 11a is excluded from a deposition target when the half mirror layer 12 is formed. That is, the half mirror layer 12 is formed on the entire surface excluding the region of the Fresnel erect wall 11b extending in a direction parallel to the thickness direction in the boundaries of the plurality of grooves of the Fresnel-shaped portion 11a. In this case, since the half mirror layer 12 is not present in the spot of the Fresnel erect wall 11b, reflection on the Fresnel erect wall 11b taking an optical path except for normal transmission or one-time reflection is suppressed, and thus occurrence of an unintended light ray caused due to the reflection is minimized. Accordingly, occurrence of a flare image is also reduced.

The sealed layer 13 is provided to cover the uneven portion of the Fresnel-shaped portion 11a of the Fresnel lens 11 and form a flat surface. The sealed layer 13 is formed by filling and curing, for example, a transparent material such as a ultraviolet (UV) curable resin. Only a material having a refractive index (n3) which is substantially the same as the Fresnel lens 11 is used as the material of which the sealed layer 13 is formed.

One surface 13a of the sealed layer 13 in the thickness direction is flat and a surface 13b adhered with the Fresnel-shaped portion 11a and the half mirror layer 12 is formed in a front surface shape complementing the unevenness of the Fresnel-shaped portion 11a.

The transparent plate 14 is provided to protect the front surface of the combiner 10. The transparent plate 14 is formed of a transparent material with a refractive index (n2) which is substantially the same as the Fresnel lens 11 and is formed in a thin plate shape.

As illustrated in FIG. 3A, the anti-reflection (AR) coat layers 15 and 16 are formed on two outside surfaces of the combiner 10 in the thickness direction. Accordingly, it is possible to prevent reflection of light incident on the combiner 10 from the outside and light emitted from the combiner 10 from the front surfaces. Accordingly, specifically, it is possible to prevent occurrence of a ghost image with the same magnification or halation caused due to internal irregular reflection.

The combiner 10 illustrated in FIGS. 3A and 3B is embedded to be integrated as an intermediate layer in the windshield WS in the example illustrated in FIGS. 1 and 2. That is, the half mirror layer 12 of the combiner 10 forms the Fresnel mirror region FM illustrated in FIGS. 1 and 2. The half mirror layer 12 forms the Fresnel mirror with optical magnification in accordance with the shape of the Fresnel-shaped portion 11a, and therefore forms an expansion optical system for light incident from the HUD unit 20. Accordingly, it is possible to form a virtual image at a position (the virtual image formation surface 24) distant in front of the windshield WS.

In the example illustrated in FIGS. 1 and 2, the combiner 10 is integrated with the windshield WS, but the independent combiner 10 may be disposed at a different position from the windshield WS, for example, on the dashboard 22 in an inclined state.

<Description of Characteristic Operation>

In the combiner 10 illustrated in FIGS. 3A and 3B, the refractive index (n1) of the material of the Fresnel lens 11 the refractive index (n2) of the material of the transparent plate 14, and the refractive index (n3) of the material of the sealed layer 13 are all set to be equal. Accordingly, it is possible to prevent refraction of light caused due to a difference in the refractive index in the boundary between the Fresnel lens 11 and the sealed layer 13 and the boundary between the sealed layer 13 and the transparent plate 14.

Therefore, for example, a scene in front of the vehicle viewed by the driver at the eye point EP illustrated in FIG. 2 is viewed as an image with the same magnification without occurrence of optical magnification even when incident light is transmitted through the Fresnel mirror region FM. That is, a difference does not occur in the size, the position, the shape, or the like of the image of the viewed scene between a case in which the scene in front of the vehicle is viewed via the Fresnel mirror region FM and a case in which the scene is viewed via other regions on the windshield WS. Therefore, even when the Fresnel mirror region FM is used, a good visual field necessary for driving can be ensured. Since reflection of light on the front surface and the rear surface of the combiner 10 is suppressed by the AR coat layers 15 and 16, it is possible to prevent occurrence of a ghost image with the same magnification or halation caused due to internal irregular reflection.

By disposing the combiner 10 including the expansion optical system using the Fresnel lens 11 on the windshield WS or in the vicinity of the windshield WS, a virtual image at a broad visual field angle can be displayed with the HUD unit 20. Further, since it is not necessary to include an expansion optical system on the side of the HUD unit 20, the HUD unit 20 can be miniaturized, and thus the area of the opening 22a can also be reduced.

<Description of Fresnel Pitch P>

In the combiner 10 illustrated in FIG. 3B, a pitch at which the plurality of grooves are formed in the Fresnel-shaped portion 11a, that is, the Fresnel pitch P, is decided to be an approximate value of the following formula or a smaller value than the approximate value:

$$P=(\tan \theta \cdot D)/\text{Pixel} \qquad (1),$$

where θ is a display view angle, D is a distance between an assumed eye point and the Fresnel-shaped portion, and Pixel is the number of vertical or horizontal pixels on the display screen of the HUD unit 20.

For example, in a case in which the number of vertical or horizontal pixels on a screen of a flat panel display inside the HUD unit 20 is 640 [pixels] is assumed, a display view angle θ is equal to 16 [deg], and a distance D is equal to 1000 [mm], P=0.45 [mm] is obtained from the foregoing formula (1).

By deciding the Fresnel pitch P of the Fresnel-shaped portion ha in this way, it is possible to ensure a necessary minimum dot pixel display capability necessary for the HUD unit 20 in regard to a display image viewed by the driver at the eye point EP. Further, it is possible to prevent spectral diffraction (occurrence of iridescent colors) caused due to diffraction in a Fresnel edge portion or a ghost of a double image or the like, and thus it is possible to reduce occurrence of a flare image caused due to irregular reflection.

Description of Modification Example

<Adoption of Band Stop Filter>

In the combiner 10 illustrated in FIG. 3B, the half mirror layer 12 is configured to have a function of a band stop filter. That is, characteristics are formed such that reflection characteristics of light from the half mirror layer 12 vary according to a difference in a wavelength.

For example, in a case in which a laser light source is used as a light source of display light to be incident on the combiner 10, laser light is emitted with only a considerably narrow wavelength band. The half mirror layer 12 is configured to have the characteristics of the band stop filter in which the laser light with only the wavelength band is reflected and light with other wavelengths is all transmitted. Accordingly, external light with a wavelength band other than the wavelength band of the laser light can be transmitted through the half mirror layer 12 without substantial attenuation. Accordingly, even in a case in which a driver views a scene in front of a vehicle through the Fresnel mirror region FM, the transmittance of the combiner 10 is high. Therefore, it is possible to view the scene in a bright state as in a region other than the Fresnel mirror region FM.

In a case in which full-color display is performed by the HUD unit 20, three laser light sources emitting laser light with R, G, and B wavelengths may be used. In this case, the half mirror layer 12 is configured to have the characteristics of the band stop filter in which light with the R wavelength band, the G wavelength band, and the B wavelength band is reflected.

In a case in which a laser light source is used, an entire rectangular region can be illuminated uniformly by sequentially scanning each region of a display surface in the left, right, upper, and lower directions using a laser scanner, and thus display light can be formed.

<Adjustment of Optical Axis and Layout>

Figure 4:
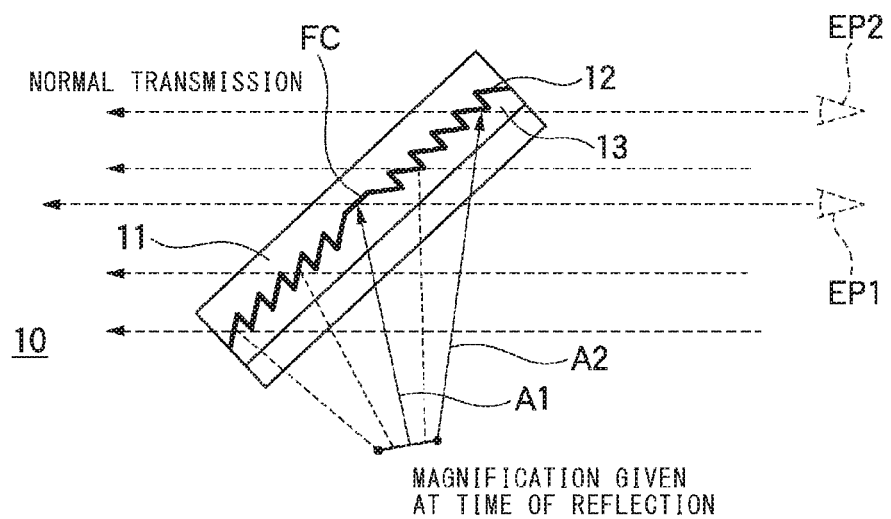
FIG. 4 is a longitudinal sectional view illustrating a disposition state of the display light projection optical device and a positional relation between an optical axis of a display device and an eye point.

A disposition state of the combiner 10 (display light projection optical device) and a positional relation between an optical axis of a display device and an eye point are illustrated in FIG. 4.

In a generally considered disposition, an optical axis A1 of light emitted by the HUD unit 20 is configured to match the middle of the combiner 10, that is, a Fresnel center FC of the Fresnel lens 11, as in FIG. 4. In this case, a display image of the HUD unit 20 is reflected from the half mirror layer 12 so that the display image can be viewed at a position of an eye point EP1 facing the Fresnel center FC.

On the other hand, in the modification example, light emitted from the HUD unit 20 is positioned so that the light is moved at a position offset from the Fresnel center FC as in an optical axis A2 illustrated in FIG. 4. In this case, a display image of the HUD unit 20 is reflected at a position shifted on the upper side of the Fresnel center FC and is formed to be viewed at an eye point EP2.

There is a possibility that the display image viewed at the eye point EP includes an unnecessary image reflected from the front surface or the rear surface of the combiner 10 and reaching the eye point EP as well as the display image reflected from the half mirror layer 12. Therefore, a double image ghost is accordingly viewed in some cases. However, in a case in which an optical path of the display image is deviated from the Fresnel center FC as in the optical axis A2 illustrated in FIG. 4, an optical path difference between an expanded image reflected from the half mirror layer 12 and a same-sized image reflected from the front surface or the rear surface of the combiner 10 is increased, and thus the double image ghost is rarely seen.

<Adoption of Curved Surface Shape>

Figure 5:
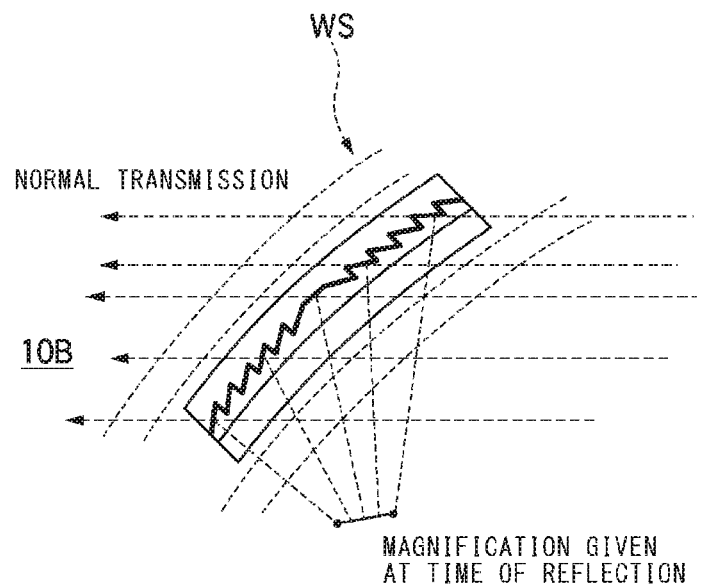
FIG. 5 is a longitudinal sectional view illustrating the shape of a display light projection optical device according to a modification example.

The cross-sectional shape of a combiner 10B (display light projection optical device) according to the modification example is illustrated in FIG. 5.

As illustrated in FIGS. 1 and 2, in the case in which the combiner 10 is mounted as the intermediately layer in the windshield WS, it is desirable to change the shape of the combiner into a curved surface shape as in the combiner 10B illustrated in FIG. 5 in order to optimize HUD display quality.

When a curvature (base curve) of the Fresnel surface is optically designed in the combiner 10B illustrated in FIG. 5, the curvature is decided according to a spherical surface expressed with a constant radius (R) or an aspheric surface expressed in a polynomial in conformity to the curved surface shape inherent to the windshield WS.

Accordingly, the HUD display quality is improved, and thus the same transmission visibility as that of a case of viewing through the normal windshield WS can be ensured even in a case in which a front visual field is viewed through the Fresnel mirror region FM.

Here, the characteristics of the embodiment of the display light projection optical device according to the above-described invention will be simply listed in the following (1) to (8).

(1) A display light projection optical device (combiner 10) that has characteristics in which display light emitted from a display unit (HUD unit 20) is reflected in the vicinity of one surface and is projected to a predetermined eye point (EP), and external light incident on the other surface is transmitted in a thickness direction, the display light projection optical device (combiner 10) including:

a first optical member (Fresnel lens 11) that is transparent and is formed in a thin plate shape;

a Fresnel-shaped portion (11a) that is formed by a plurality of grooves which are concentric with each other on one surface of the first optical member in a thickness direction thereof;

a half mirror layer (12) that is formed on a surface of a Fresnel-shaped portion;

a second optical member (sealed layer 13) that is formed of a transparent filler for filling unevenness of a surface of the half mirror layer to form a flat surface; and a third optical member (transparent plate 14) that has a transparent thin plate shape protecting an outside surface of the second optical member, wherein a refractive index of the first optical member, a refractive index of the second optical member, and a refractive index of the third optical member are substantially equal.

(2) The display light projection optical device having the configuration of the foregoing (1), wherein light anti-reflection layers (AR coat layers 15 and 16) are formed on a surface of the first optical member exposed to the outside and a surface of the third optical member exposed to the outside.

(3) The display light projection optical device having the configuration of the foregoing (1) or (2), wherein the half mirror layer performs as a band stop filter that reflects only a specific wavelength component.

(4) The display light projection optical device having the configuration of any one of the foregoing (1) to (3), wherein the display light projection optical device is disposed as an intermediate layer of laminated glass of which a vehicle windshield (WS) is formed.

(5) The display light projection optical device having the configuration of any one of the foregoing (1) to (4), wherein a disposition state of the Fresnel-shaped portion or an incident target position of the display light is decided so that an optical axis (A2) of light incident on the half mirror layer from the display unit is shifted from a center (Fresnel FC) of the concentric form of the Fresnel-shaped portion.

(6) The display light projection optical device (combiner 10B) having the configuration of any one of the foregoing (1) to (5), wherein the entire shape of the first optical member and the shape of the Fresnel-shaped portion have a curved surface shape conforming to a shape of the vehicle windshield and a curvature of a surface of the Fresnel-shaped portion is decided according to a spherical surface expressed with a constant radius or an aspheric surface expressed in a polynomial.

(7) The display light projection optical device having the configuration of any one of the foregoing (1) to (6), wherein a pitch P at which the plurality of grooves are formed in the Fresnel-shaped portion is an approximate value of the following formula:

$$P=(\tan \theta \cdot D)/\text{Pixel}$$

where θ is a display view angle,

D is a distance between an assumed eye point and the Fresnel-shaped portion, and Pixel is a number of vertical or horizontal pixels on a display screen of the display unit.

(8) The display light projection optical device having the configuration of any one of the foregoing (1) to (7), wherein the half mirror layer is formed on an entire surface, excluding an erect wall region (Fresnel erect wall 11b) extending in a direction parallel to the thickness direction in boundaries of the plurality of grooves of the Fresnel-shaped portion.

The invention has been described with reference to the detailed or specific embodiment, but it is apparent to those skilled in the art that the invention is modified or corrected in various forms without departing from the spirit and the scope of the invention.

According to the invention, it is possible to obtain advantageous effects of having the optical expansion function and the reflection surface available for projection of the HUD and the good transmission visibility. The invention having the advantageous effects is useful for a display light projection optical device having characteristics in which display light emitted from a display unit is reflected in the vicinity of one surface and is projected to a predetermined eye point, and external light incident on the other surface is transmitted in a thickness direction.

What is claimed is:

1. A display light projection optical device, having characteristics in which display light emitted from a display unit is reflected in a vicinity of one surface and is projected to a predetermined eye point, and in which external light incident on an other surface is transmitted in a thickness direction, the display light projection optical device comprising:
a first optical member that is transparent and is formed in a thin plate shape;
a Fresnel-shaped portion that is formed by a plurality of grooves which are concentric with each other on one surface of the first optical member in a thickness direction thereof;
a half mirror layer that is formed on a surface of a Fresnel-shaped portion;
a second optical member that is formed of a transparent filler for filling unevenness of a surface of the half mirror layer to form a flat surface; and
a third optical member that has a transparent thin plate shape and protects an outside surface of the second optical member, a refractive index of the first optical member, a refractive index of the second optical member, and a refractive index of the third optical member are substantially equal.

2. The display light projection optical device according to claim 1, wherein light anti-reflection layers is formed on a surface of the first optical member exposed to the outside and a surface of the third optical member exposed to the outside.

3. The display light projection optical device according to claim 1, wherein the half mirror layer performs as a band stop filter that reflects only a specific wavelength component.

4. The display light projection optical device according to claim 1, wherein the display light projection optical device is disposed as an intermediate layer of laminated glass forming a vehicle windshield.

5. The display light projection optical device according to claim 1, wherein a disposition state of the Fresnel-shaped portion or an incident target position of the display light is decided so that an optical axis of light incident on the half mirror layer from the display unit is shifted from a center of the concentric form of the Fresnel-shaped portion.

6. The display light projection optical device according to claim 1, wherein:
an entire shape of the first optical member and a shape of the Fresnel-shaped portion have a curved surface shape conforming to a shape of a vehicle windshield, and
a curvature of a surface of the Fresnel-shaped portion is decided according to a spherical surface expressed with a constant radius or an aspheric surface expressed in a polynomial.

7. The display light projection optical device according to claim 1, wherein a pitch P at which the plurality of grooves is formed in the Fresnel-shaped portion is an approximate value of the following formula:

$$P=(\tan q \times D)/\text{Pixel},$$

where q is a display view angle, D is a distance between 5 an assumed eye point and the Fresnel-shaped portion, and Pixel is a number of vertical or horizontal pixels on a display screen of the display unit.

8. The display light projection optical device according to claim 1, wherein the half mirror layer is formed on an entire surface, excluding an erect wall region extending in a direction parallel to the thickness direction in boundaries of the plurality of grooves, of the Fresnel-shaped portion.

9. The display light projection optical device according to claim 1, wherein:
the one surface of the first optical member is an opposite surface with respect to the other surface of the first optical surface in the thickness direction, and
the display light is incident on the one surface of the first optical member, and external light is incident on the other surface of the first optical member.

10. The display light projection optical device according to claim 1, wherein:
the half mirror layer is formed on a surface of the plurality of grooves of the Fresnel-shaped portion, and
the unevenness of the surface of the half mirror layer corresponds to the shape of the plurality of grooves.

11. The display light projection optical device according to claim 6, wherein
a curvature of at least one surface of the half mirror layer is substantially concentric with a curvature of a surface of the second optical member.

12. The display light projection optical device according to claim 1, wherein at least one surface of the half mirror layer is substantially parallel to a surface of the second optical member.

\* \* \* \* \*